Jan. 8, 1963 M. A. MEYER 3,072,903
SIGNAL SWITCHING APPARATUS
Filed June 22, 1953 2 Sheets-Sheet 1
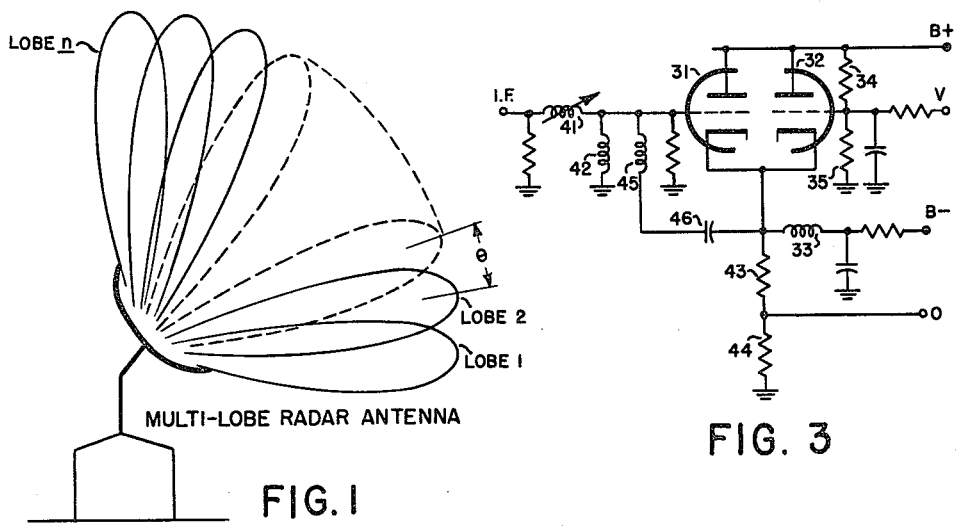
FIG. 1
FIG. 3
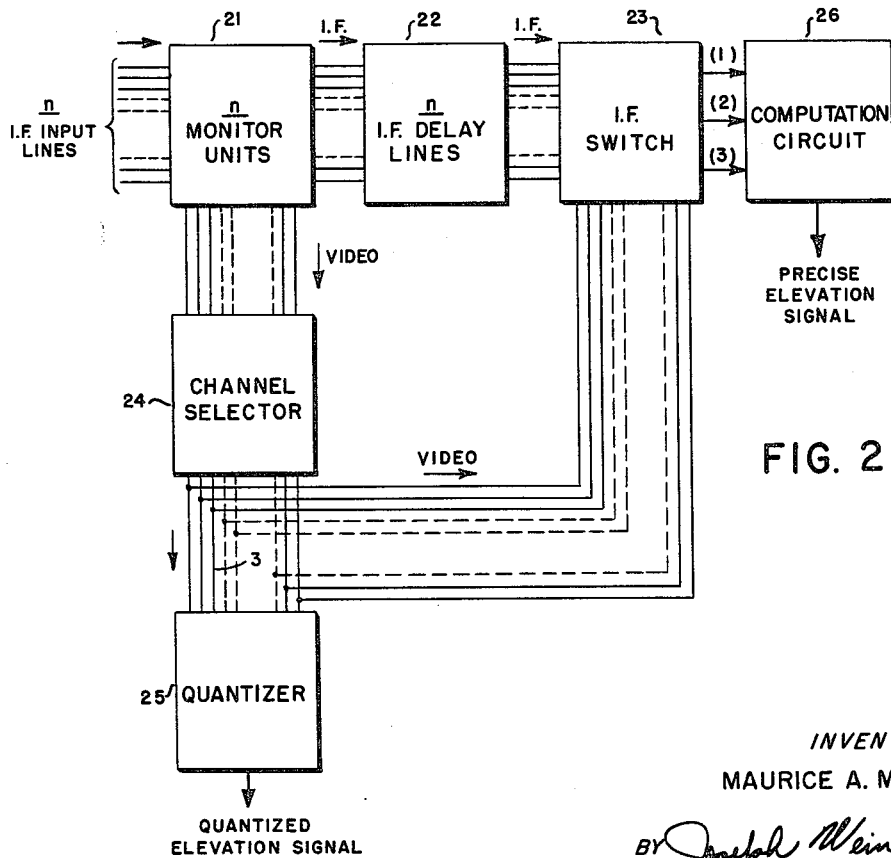
FIG. 2
INVENTOR
MAURICE A. MEYER
BY Joseph Weingarten
ATTORNEY

INVENTOR
MAURICE A. MEYER
ATTORNEY 3,072,903
Patented Jan. 8, 1963

3,072,903
SIGNAL SWITCHING APPARATUS
Maurice A. Meyer, Natick, Mass., assignor to Laboratory For Electronics, Inc., Boston, Mass., a corporation of Delaware
Filed June 22, 1953, Ser. No. 362,992
14 Claims. (Cl. 343—16)

The present invention relates in general to electronic high frequency signal selection and more particularly concerns the utilization of novel switching techniques for the reliable interpretation and presentation of radar data.

In the development of search radar, there have been two fundamental approaches to the determination of target altitude simultaneously with range and azimuth. The earliest approach was the use of an auxiliary radar system whose sole function was to gather information on elevation, so that with the available range information from the primary radar, calculations as necessary for the determination of height could be performed. Another approach was the use of a special multi-lobe system; as for example, the one designated in the art as V-beam radar. When an auxiliary radar is used, there is the disadvantage that altitude information is not obtained simultaneously with azimuth and range data so that independent operations and calculations must be performed. Obviously, this limits the number of targets whose elevations are measurable during any given interval of time. In the V- beam system, altitude information is ultimately determined by an operator since the nature of the received data does not lend itself readily to automatic computation.

In an effort to provide three-coordinate information, that is, range, azimuth, and elevation, without the associated limitations of the above-described systems, there has been proposed a height-finder radar system utilizing a multi-lobe receiving antenna in cooperation with a transmitter which radiates a periodic pulsed microwave beam comparatively narrow in azimuthal width and substantially uniformly fan-shaped in elevation. The receiving antenna is arranged whereby the individual receiving lobes are angularly spaced in uniform overlapping relation in elevation, each lobe being oriented to a predetermined elevation angle with respect to the surface. The entire radar antenna system is adapted to be scanned in azimuth by mechanical rotation, and, as a consequence, a pre-selected volume of space is searched.

In the event that this radar unit encounters a single target in space, the nature of the received signals will be as follows: For each transmitted pulse at the target azimuth and at a time subsequent to the instant of the transmitted pulse representative of target range, pulsed signals will be obtained in at least three adjacent antenna lobes. On the assumption that the energy distribution in the transmitter beam is uniform in respect to elevation, then the received pulse amplitude will be a maximum in that lobe most nearly corresponding to the angular elevation of the target. It follows that a first approximation of target elevation is obtainable by merely providing an indication of the angular disposition of the lobe yielding the maximum signal, while true elevation angle may be calculated to a substantial degree of accuracy by employing adjacent lobe return pulses for a computation in the nature of interpolation.

It is a primary object of the present invention to provide apparatus for selectively deriving, for computation and presentation, a number of signals in a pre-selected order, from a larger number of parallel and simultaneously occurring input signals. With specific application to a multi-lobe radar height finder, it is an object of this invention to provide apparatus which, by selective switching, yields unambiguous information on the lobe carrying the maximum target echo and further provides adjacent lobe signals to permit automatic computation of target elevation.

Other objects and advantages of the present invention will now become apparent from the following detailed specification when taken in connection with the accompanying drawing in which:

FIG. 1 is a schematic illustration of the radiation pattern of a multi-lobe height-finder radar antenna;

FIG. 2 is a block diagram of the essential circuits functionally identified necessary for selectively processing received parallel line data for computation purposes;

FIG. 3 is a schematic circuit diagram of a switching element of the intermediate frequency switch circuit forming a part of the apparatus illustrated in FIG. 2.

Figure 4:
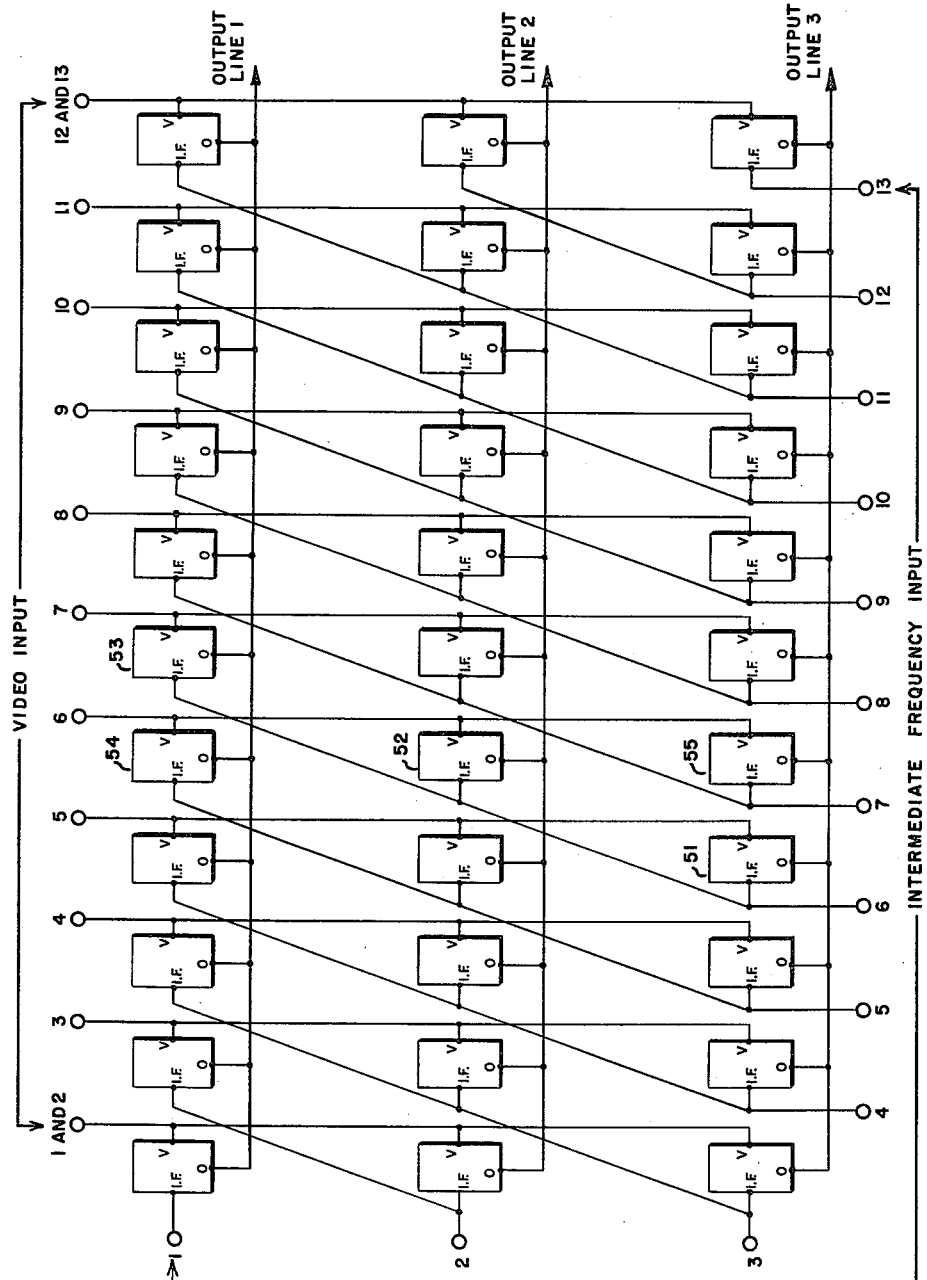
FIG. 4 illustrates the manner in which elements of the type illustrated in FIG. 3 are combined to form a multi-line intermediate frequency switching unit.

As an aid to describing the operation of the present invention, there has been illustrated in FIG. 1 a schematic representation of the radiation pattern of a multi-lobe radar antenna 11 for height finder application. No attempt whatever has been made to disclose the precise physical features of the antenna, as this forms no part of the present invention. However, functionally, the antenna provides means for receiving energy in $n$ lobes uniformly separated in elevation by an angle $\theta$. The number of lobes provided will depend on a number of considerations, foremost of which is the desired system precision. In one practical application of the novel principles herein disclosed, a thirteen-lobe antenna was found to permit detection of information to fulfill a design objective of elevation angle determination to an accuracy within one percent.

Echo pulse energy received in each of the $n$ lobes is individually amplified and converted to intermediate frequency (I.F.). FIG. 2 illustrates the novel data processing arrangement, and has as its input the $n$ intermediate frequency signals of the radar receiver on $n$ I.F. input lines. These are applied to $n$ individual monitor units, collectively indicated by block 21.

All monitor units are essentially identical in circuit design and purpose. Primarly, these circuits are adjustable I.F. amplifiers so that the gain of all channels as measured from the antenna to the monitor output may be substantially equalized. Each monitor channel provides an I.F. output and additionally includes means for detecting the intermediate frequency signals to provide a video output. The I.F. outputs of the parallel monitor units are applied as illustrated, through corresponding I.F. delay lines collectively indicated as block 22 (and whose purpose will be discussed hereinbelow) to an I.F. switch 23. The $n$ video outputs of the monitor units are applied on parallel lines to channel selector 24 whose function is to yield upon the simultaneous application of video signals upon any number of the input lines, an output signal on but one of its $n$ output lines, this line corresponding to the receiver lobe channel carrying the largest signal return.

Apparatus for performing the function of continuously selecting the signal channel having the largest signal ampltiude from a plurality of input channels has been presented in detail in the copending application of Maurice A. Meyer, Serial No. 311,885, filed September 27, 1952 (now U.S. Patent No. 2,974,286) and entitled Channel Selector. As there disclosed, the channel selector was comprised of a parallel plurality of intercoupled similar channel selector unit circuits. Upon the simultaneous application of $n$ input video pulses, a common line in the circuit instantaneously reached the potential of the maximum pulse, and precluded the transmission to the output of all but the signal from the channel carrying the maximum.

In FIG. 2, the $n$ output lines of channel selector 24 have been indicated as entering a quantizer 25, whose property is to generate a signal having an amplitude indicative of the number of the channel instantaneously carrying the maximum signal. When used with a height-finder radar system, having an antenna such as shown in FIG. 1, examination of the signal output amplitude of quantizer 25 immediately permits determination of the receiving antenna lobe carrying the maximum signal. This, in turn, permits an immediate rough determination of target elevation.

As further illustrated in FIG. 2, the $n$ line output of the channel selector is directly applied to intermediate frequency switch 23 for actuation and control thereof. As will be disclosed later, it is characteristic of switch 23 to provide as an output, three I.F. signals, one of which is the maximum amplitude received on the $n$ input channel lines and the other two of which are the signal amplitudes received on the lines immediately adjacent the line then carrying the maximum. In FIG. 2, the three-line output of the I.F. switch 23 is shown applied to a computation circuit 26 for the purpose of weighting or interpolating the amplitudes of the signals adjacent the maximum to yield an output signal precisely proportional to the elevation of a target received by the antenna system of FIG. 1. The exact nature of computation circuit 26 and quantizer 25 need not be presented here as they are included only to illustrate a complete system utilizing this invention.

To summarize operation of the circuit shown in FIG. 2 with an example, assume that the antenna of FIG. 1, at a particular azimuth, detects a target which lies slightly above the axis of the third lobe energy maximum. By virtue of the antenna receiving pattern, radar pulse signals will be received for each transmitted pulse in a number of lobes, as follows: A signal maximum in lobe 3, a somewhat smaller signal in lobe 4, a still smaller signal in lobe 2, and possibly smaller signals in the remaining lobes. These signals will appear simultaneously at intermediate frequency on the $n$ input parallel lines in FIG. 2. Monitor units 21 will provide gain-corrected signals to the corresponding I.F. delay lines 22 and equal or proportionate amplitude video signals to channel selector 24. Channel selector 24, operative on the principles disclosed in the aforementioned patent application, will provide a single output pulse on line 3 which will actuate quantizer 25 to produce a pulse whose amplitude is indicative of channel 3 and will further actuate I.F. switch 23 to provide on the three output lines thereof the I.F. signals then present on channels 2, 3 and 4. Computation circuit 26, operating on the three received pulses, the center of which is the maximum, will provide as an output, a precise indication of target elevation angle. In this system, the I.F. delay lines introduce short but controlled time delays in the transfer of the I.F. signals between the monitor outputs and the I.F. switch inputs to compensate for the slight delay encountered in channel selector and I.F. switch operation.

As noted, the function of I.F. switch 23 is to accept the $n$ I.F. signals and to selectively provide three of these as an output in response to actuation by the channel selector output. FIGS. 3 and 4 disclose the details of the I.F. switch arrangement. In FIG. 3, the circuit of an individual switch element is illustrated schematically, and in FIG. 4, the switch element arrangement is presented in its entirety.

With particular reference to FIG. 3, each switch element is seen to comprise a pair of cathode-coupled triodes 31 and 32, both connected as cathode followers between a positive source B+ for the plates and a negative source B— for the common cathodes. Inductor 33 is used to tune out the cathode-to-ground capacitance. The grid of triode 31 is resistively returned to ground, while the grid of tube 32 is connected to the junction of voltage-divider resistors 34 and 35 between B+ and ground. Thus, tube 32 is normally conductive and raises the common cathode potential to a sufficiently positive value to cut-off tube 31. I.F. signals are applied to the switch element at terminal I.F., and through an adjustable transformer formed of primary and secondary windings 41 and 42, respectively, these signals are coupled to the grid of triode 31. By provision of this transformer adjustment, compensation for gain variation between switch elements may be provided. This is particularly important because the monitor gain adjusting units precede the I.F. switch in the system. Since the cathode load comprising resistors 43 and 44, in series, provides considerable degeneration, this transformer adjustment will be essentially independent of tube aging and tube changes. Video signals from the channel selector are applied from terminal V to the grid of tube 32 and the switch element output is taken at terminal O, which is the junction between resistors 43 and 44. Inductor 45, in series with coupling capacitor 46, tunes the grid-to-cathode capacity of tube 31 at the input frequency to prevent spurious feed-through from input to output.

In operation of a switch element, the application of a negative video pulse at terminal V will cut-off tube 32, permitting conduction in tube 31. In this manner, an I.F. signal appearing at terminal I.F. will be transferred through to terminal O during the interval of the gating pulse.

In FIG. 4, there is shown an I.F. switch arrangement for association with a thirteen-channel height-finder radar system. Thirty-three switch elements, of the type illustrated in FIG. 3, have been arranged in eleven banks, each formed of three switch elements. The switch elements have been illustrated only in block form in FIG. 4; however, the three key terminals I.F., V and O correspond with those similarly designated in FIG. 3. Output lines 1, 2 and 3 are provided for the three horizontal rows of switch elements, and all terminals designated O in each row have been connected to the associated output line. The thirteen antenna lobes of the receiving antenna provide thirteen consecutively numbered I.F. inputs from the I.F. delay lines. Video input is derived from channel selector 24 of FIG. 2.

In the arrangement shown, there are only eleven video input terminals to the switch. To accommodate the thirteen channels, the first and second video output lines from the channel selector are connected together as are the twelfth and thirteenth video lines. The thirteen I.F. inputs are applied to the switching system by slanted lines whereby each I.F. input channel feeds advancing switch elements in three banks. For example, I.F. signal 6 is applied to terminal I.F. of switch element 51 connected to output line 3 in bank 4, terminal I.F. of switch element 52 connected to output line 2 in bank 5, and terminal I.F. of switch element 53 connected to output line 1 in bank 6.

The application of a negative video input signal from channel selector 24 to one of the video input terminals will cause switching action in the three switch elements in one bank. Note for example, that if a video switching pulse is applied from the channel selector of FIG. 2 to video input channel 6, switch elements 54, 52 and 55 will operate and output line 1 will contain the I.F. signal received in channel 5; output line 2, the I.F. signal received in channel 6; and output line 3, the I.F. signal received in channel 7. In other words, when the channel selector indicates that channel 6 contains a signal maximum, the output will consist of the I.F. signals in channels 5, 6 and 7.

The exceptions are the circuit arrangements for I.F. input channels 1 and 2, and 12 and 13. Thus, if either channel 1 or 2 contains the signal maximum, the output lines will, in each case, provide the signals of channels 1, 2 and 3, and also if either channel 12 or 13 contains the signal maximum, the computation arrangement will receive the signals from channels 11, 12 and 13. Should any two adjacent channels have equally large incoming signals, two of the output transmission lines will also have equal signals. By switching the I.F. signal output of the monitor units of FIG. 2 rather than the video, switching transients and spurious responses are substantially eliminated.

From an examination of the system of FIG. 2, it will be apparent that numerous applications exist outside the field of radar and radar height finding. Evidently, this circuit arrangement may be utilized wherever it is desired to select a relatively small number of signals from a larger number of inputs with reference to some predetermined characteristic of one of the available signals, such as maximum amplitude. There is no limitation to the number of channels which may be incorporated, nor is there a need for combining two or more video lines as shown in FIG. 4.

In view of the fact, therefore, that numerous modifications and departures may now be made by those skilled in this electrical art, the invention herein is to be construed as limited only by the spirit and scope of the appended claims.

What is claimed is:

1. In signal selection apparatus, an input system having a first plurality of input signal lines and an output system having a second and lesser plurality of output signal lines, means for selecting one of said input signal lines on the basis of a predetermined characteristic of the signal thereon, and means actuated from the signal line thereby selected for coupling a second plurality of said input lines including the aforesaid selected line to said output lines respectively.

2. In signal selection apparatus, an input system having a first plurality of input signal lines and an output system having a second and lesser plurality of output signal lines, means for selecting the input signal line carrying a signal of predetermined amplitude characteristic, and means actuated from the signal line thereby selected for coupling a second plurality of said input lines including the aforesaid selected line respectively to said output lines.

3. In signal selection apparatus, an input system having a first plurality of input signal lines and an output system having a second and lesser plurality of output signal lines, means operative for selecting that one of said input signal lines carrying the signal of maximum amplitude, and switching means actuated by said signal of maximum amplitude for coupling a second plurality of said input lines including the aforesaid maximum signal line respectively to said output lines.

4. Signal selection apparatus comprising, in combination, means for simultaneously applying a plurality of input signals, means for selecting the signal of maximum amplitude, and means actuated by said maximum amplitude signal for providing as an output a preselected smaller plurality of input signals including said signal of maximum amplitude.

5. Signal selection apparatus comprising, means for applying a plurality of input signals on a first number of parallel input signal lines, means for selecting the input line carrying the input signal of maximum amplitude, and switching means actuated by said maximum amplitude signal for providing as an output said maximum amplitude signal and the signals on input lines adjacent thereto.

6. Signal selection apparatus comprising, an input system having a first plurality of parallel input signal lines and three output signal lines, means for applying high frequency signals of variable amplitudes to said input signal lines, means for selecting the input line carrying the input signal of maximum amplitude, and switching means actuated from said input line carrying the maximum amplitude input signal for respectively coupling said maximum input high frequency signal and the signals on lines immediately adjacent thereto to said three output lines.

7. Signal selection apparatus comprising, an input system having $n$ consecutive parallel input signal lines and a lesser number $k$ parallel output lines, means for applying $n$ variable amplitude high frequency signals respectively to said $n$ input lines, means for providing a signal indicative of the input line instantaneously carrying the maximum amplitude input high frequency signal, electronic switch means, means for applying said $n$ high frequency signals as inputs to said electronic switch means for actuating said electronic switch with said signal indicative of the input line carrying the maximum amplitude signal, said electronic switch including means responsive to being so actuated for selectively energizing said $k$ output lines from said input line carrying said signal maximum and from input lines adjacent thereto.

8. Signal selection apparatus comprising, an input system having $n$ consecutive parallel input signal lines, means for applying $n$ input high frequency signals of varying amplitude distribution to said $n$ input lines respectively, a channel selector having $n$ output lines and energized from said $n$ input signal lines, said channel selector having the characteristic of providing an actuating signal on the output line thereof corresponding to the input signal line instantaneously carrying the maximum amplitude high frequency signal, an electronic switch system coupled to said $n$ high frequency input signals and to said $n$ output lines of said channel selector and having at least three output lines, said electronic switch including means responsive to the application of said actuating signal for energizing one of said electronic switch output lines from the input signal line carrying the maximum amplitude signal while energizing the remainder of said electronic switch output lines respectively from input signal lines oppositely disposed with reference to said maximum amplitude signal line.

9. Apparatus as in claim 8 and including means for introducing time delay in the signal coupling between said electronic switch and said $n$ high frequency input lines.

10. Signal selection apparatus comprising, an input system having $n$ consecutive parallel input signal lines, means for applying $n$ input high frequency signals of varying amplitude distribution to said $n$ input lines respectively, a channel selector energized from said $n$ input signal lines and having $n$ output lines, said channel selector having the characteristic of providing an actuating signal solely on the output line thereof corresponding to the input signal line instantaneously carrying the maximum amplitude high frequency signal, a switching system having banks of electronic switch elements arranged in a plurality of parallel rows, means coupling each of said input signal lines to a switch element in each row in consecutive banks, means coupling said actuating signal output of said channel selector to all electronic switch elements in a predetermined bank, a system output line for each of said parallel rows of electronic switch elements, and means responsive to the application of said actuating signal for energizing one of said system output lines from the input signal line carrying the maximum amplitude input high frequency signal while energizing the remainder of said system output lines from high frequency input signal lines adjacent thereto.

11. Signal selection apparatus comprising, an input system having $n$ consecutive parallel input signal lines, means for applying $n$ input high frequency signals of varying amplitude distribution to said $n$ input lines respectively, a channel selector energized from said $n$ input signal lines and having $n$ output lines, said channel selector having the characteristic of providing an actuating signal solely on the output line thereof corresponding to the input signal line instantaneously carrying the maximum amplitude high frequency signal, a switching system having a plurality of banks of electronic switch elements arranged in three parallel rows, means coupling each of said input signal lines to three switch elements in consecutive banks, means coupling said actuating signal output of said channel selector to three electronic switch elements in one bank, a system output line for each of said three parallel rows of electronic switch elements, said switching system including means responsive to the application of said actuating signal for energizing one of said system output lines from the input signal line carrying the maximum amplitude input high frequency signal while energizing the remaining two of said system output lines from the high frequency input signal lines oppositely adjacent thereto.

12. Signal selection apparatus comprising, an input system having $n$ consecutive parallel input signal lines, means for applying $n$ input high frequency signals of varying amplitude distribution to said $n$ input lines respectively, a channel selector energized from said $n$ input signal lines and having $n$ output lines, said channel selector having the characteristic of providing an actuating signal solely on the output line thereof corresponding to the input signal line instantaneously carrying the maximum amplitude high frequency signal, a switching system having a plurality of banks of electronic switch elements arranged in three parallel rows, means coupling each of said input signal lines to three switch elements in consecutive banks, means coupling each of said $n$ output lines of said channel selector to three electronic switch elements in one bank, a system output circuit for each of said three parallel rows of electronic switch elements, said switching system including means responsive to the application of said actuating signal to three switch elements in one bank for energizing one of said system output circuits from the input signal line carrying the maximum amplitude high frequency signal while energizing the remaining two of said system output circuits from the high frequency input signal lines oppositely adjacent thereto.

13. Apparatus for association with a radar height-finding system having a receiving system which includes a plurality of sequential receiving channels comprising, a channel selector for indicating the receiving channel instantaneously carrying the maximum radar return, and electronic switching means energized by signals from said plurality of receiving channels and including means actuated from the output of said channel selector for transmitting a number of received signals fewer than said plurality but including the maximum radar return and signals in channels adjacent thereto.

14. Apparatus for association with a radar height-finding system having a receiving antenna with $n$ consecutive lobes and means for deriving $n$ corresponding consecutive intermediate frequency signals in $n$ channels respectively comprising, a channel selector operative from said $n$ intermediate frequency signals for providing an output signal indicative of the channel instantaneously carrying the maximum intermediate frequency signal, an intermediate frequency electronic switch energized by said $n$ intermediate frequency input signals and including means responsive to said channel selector output signal for providing as an output three of said intermediate frequency input signals, one of said output signals comprising the maximum and the remaining two comprising the signals carried in the channels immediately adjacent thereto.

References Cited in the file of this patent
UNITED STATES PATENTS

| | | |
|---|---|---|
| 2,388,001 | Loughren | Oct. 30, 1945 |
| 2,434,644 | Fairweather | Jan. 20, 1948 |
| 2,510,987 | Levy | June 30, 1950 |